United States Patent [19]

Scifres et al.

[11] 4,445,125
[45] Apr. 24, 1984

[54] DIODE LASER ARRAY SYSTEM FOR PRINTING AND COPYING APPLICATIONS

[75] Inventors: Donald R. Scifres, Los Altos; William Streifer, Palo Alto, both of Calif.

[73] Assignee: Xerox Corporation, Stamford, Conn.

[21] Appl. No.: 369,455

[22] Filed: Apr. 19, 1982

[51] Int. Cl.³ .................. G01D 9/42; G03B 17/04; H04N 1/22

[52] U.S. Cl. .................................. 346/108; 354/12; 358/302

[58] Field of Search .................. 346/107 R, 108; 358/302; 354/12

[56] References Cited

U.S. PATENT DOCUMENTS

4,229,750 10/1980 Kawamura et al. .......... 346/107 R
4,325,070 4/1982 Akasaki et al. .................. 346/108
4,357,619 11/1982 Klockenbrink .................. 358/302

OTHER PUBLICATIONS

J. D. Crow et al., Gallium Arsenide Laser-Array-on-Silicon Package, Applied Optics, Feb. 1, 1978, vol. 17, No. 3, pp. 479-485.

Primary Examiner—George H. Miller, Jr.
Attorney, Agent, or Firm—Leonard Zalman

[57] ABSTRACT

A linear array of injection diode lasers formed on a common substrate is utilized to provide modulated scanning beams for a photosensitive medium. A scanning device, preferably a multifaceted mirror polygon driven at a constant speed, is placed in the optical path between the array and the photosensitive medium, as is a focusing lens. To provide additive exposure intensity the plane of the emitting surface of the array is oriented relative to the scanning device so that all of the beams emitted by the array are caused to illuminate the same scan line of the photosensitive medium whereby each beam scans the same data spots on the same line of the photosensitive medium such that additive exposure of those spots is achieved. Alternatively, each laser of an array of N lasers could be used to expose only 1/N spots across a scan line thereby lowering the duty cycle for each laser whereby the pulse power emission from each laser can be increased so that one diode laser can provide the required exposure intensity at the photosensitive medium.

In those instances where a single laser can expose each spot of a scan line of a photosensitive medium with the required exposure intensity for that photosensitive medium, the emitting surface of the array can be oriented relative to the scanning device so that each beam emitted by an array of N lasers illuminates a different scan line position of the photosensitive medium. As the scanning device rotates, this orientation provides for simultaneous scanning of N scan lines. By properly choosing the orientation of the emitting surface of the array relative to the scanning device consecutive horizontal scan lines can be written with a vertical separation smaller than the separation between the lasers of the array. Advantages of these orientations is that the printing speed can be substantially increased up to N times or the rotation speed of the scanning device can be decreased up to a factor of N or any combination thereof while maintaining the same resolvable spots density.

4 Claims, 8 Drawing Figures

DIODE LASER ARRAY SYSTEM FOR PRINTING AND COPYING APPLICATIONS

BACKGROUND OF THE INVENTION

Flying spot scanning systems are generally employed to communicate video information to a photosensitive medium. Generally, such systems utilize a gas laser which generates a high intensity light beam, and a modulator, such as those electro-optical or acousto-optical in nature, for representing the video information in the form of an intensity variation of the light beam. Galvanometer arrangements driven in an oscillatory fashion or multifaceted mirror polygons driven at a constant speed control the scanning cycle. Use of gas lasers in flying spot scanning systems have several disadvantages, such as their large size, high thermal emission, short life, high power requirements and the need for an external modulator.

With the advent of injection diode lasers, with their inherent small size, substantial longevity, etc., there is potentially available a replacement for the gas lasers used in flying spot scanning systems. However, some photosensitive media require an exposure intensity beyond what can be provided by the beam emitted by a single diode laser when that beam is scanned at the conventional speed. Accordingly, there is a need for an injection diode laser flying spot scanning system that can operate at, or beyond, conventional scanning speeds.

SUMMARY OF THE INVENTION

In accordance with the invention, a linear array of injection diode lasers formed on a common substrate is utilized to provide modulated scanning beams for a photosensitive medium. A scanning device, preferably a multifaceted mirror polygon driven at a constant speed, is placed in the optical path between the array and the photosensitive medium, as is a focusing lens. To provide additive exposure intensity the plane of the emitting surface of the array is oriented relative to the scanning device so that all of the beams emitted by the array are caused to illuminate the same scan line of the photosensitive medium whereby each beam scans the same data spots on the same line of the photosensitive medium such that additive exposure of those spots is achieved. Alternatively, each laser of an array of N lasers could be used to expose only 1/N spots across a single scan line thereby lowering the duty cycle for each laser whereby the pulse power emission from each laser can be increased so that one diode laser can provide the required exposure intensity at the photosensitive medium.

In those instances where a single laser can expose each spot of a scan line of a photosensitive medium with the required exposure intensity for that photosensitive medium, the emitting surface of the array can be oriented relative to the scanning device so that each beam emitted by an array of N lasers illuminates a different scan line position of the photosensitive medium. As the scanning device rotates, this orientation provides for simultaneous scanning of N scan lines. By properly choosing the orientation of the emitting surface of the array relative to the scanning device and to the photosensitive medium consecutive horizontal scan lines can be written with a vertical separation smaller than the separation between the lasers of the array. Advantages of these orientations is that the printing speed can be substantially increased up to N times or the rotation speed of the scanning device can be decreased up to a factor of N or any combination thereof while maintaining the same resolvable spots density.

It is conventional practice to focus the beams emitted by the array at the surface of the photosensitive medium. However, by choosing an optical system that focuses the emitted beams on a plane slightly in front of or slightly behind the photosensitive medium, defocused spots will illuminate adjacent areas of the photosensitive medium, permitting a high resolution, simultaneous scan of adjacent scan lines.

DETAILED DESCRIPTION OF THE INVENTION

Figure 1:
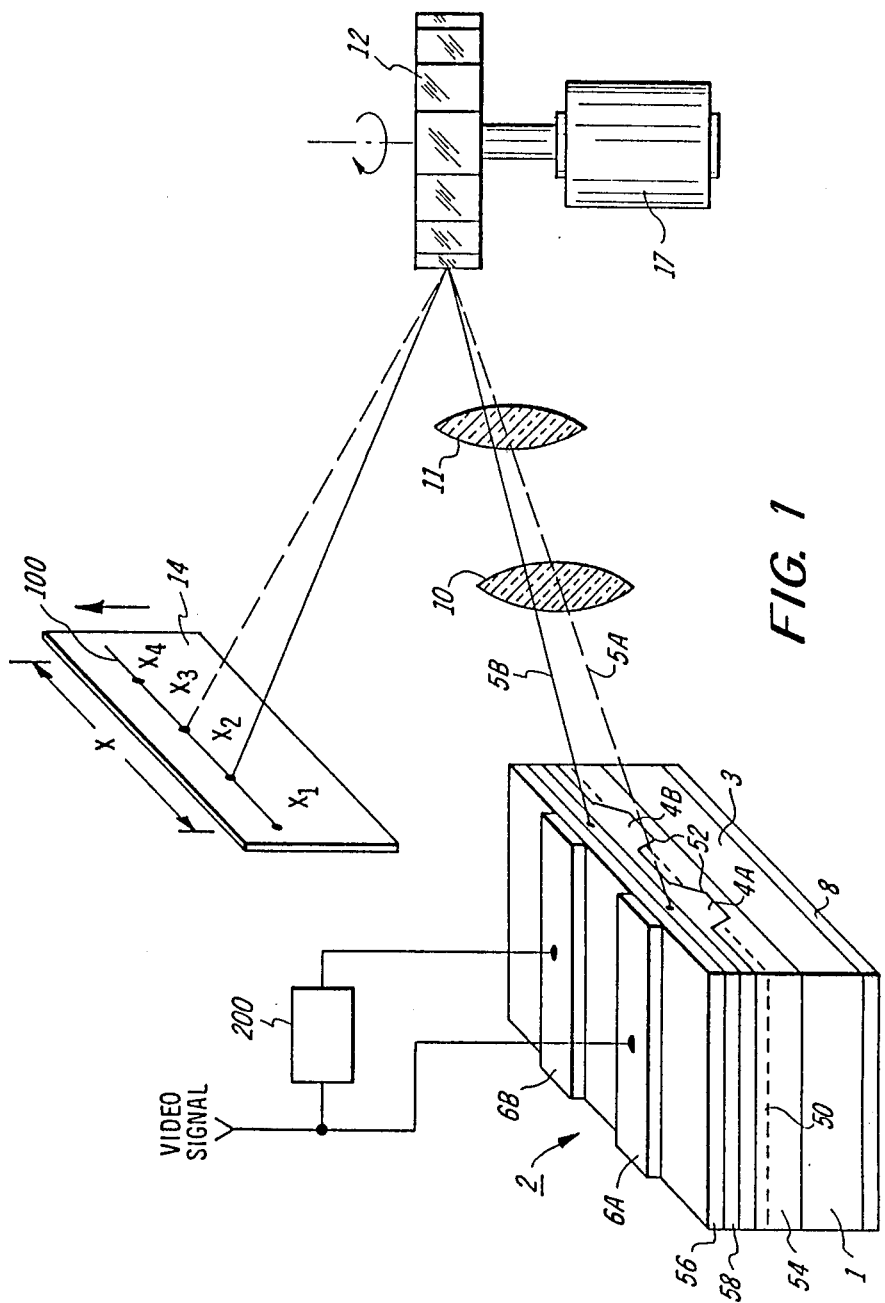
FIGS. 1 and 2 are perspective views of an optical system for simultaneously scanning a plurality of light beams across a scan line of a photosensitive surface.

Referring to FIG. 1, the flying spot printing/copying system of the invention includes a linear diode laser array 2 comprised of a plurality of injection diode lasers 4a, 4b. Lasers 4a, 4b can be of the channeled substrate type, each comprised of a portion of the substrate 1, a pump current confining junction 50, a channel 52 through a portion of junction 50, guiding layers 54 and 56, and an active region 58, such as described in U.S. Pat. No. 4,099,999, with each laser having its current drive signal provided by electrodes 6a, 6b acting in conjunction with substrate electrode 8. The current drive signals are pulse modulation representations of the video signal information to be printed or copied and the lasers 4a, 4b are driven in the pulse regime to provide modulated light output beams 5a, 5b representative of the video information to be printed or copied. Beams 5a and 5b lie in a common plane and would have a practical physical separation as low as 50–100 microns.

Flat field collector and objective lenses 10 and 11, respectively, are positioned in the optical path between the emitting surface 3 of the laser array 2 and a light beam reflecting scanning device 12. Other suitable optical systems have also been described in the scientific/technical literature and patents and the optical systems shown are not meant in any sense to be exclusive or optimal. Scanning device 12 is preferably a multifaceted mirror polygon, as shown, but alternatively can be a galvanometer driven in an oscillatory fashion. Flat field collector lens 10 collimates the diverging light beams 5a, 5b from lasers 4a, 4b, respectively, of the laser array 2, and flat field objective lens 11 causes the collimated beams 5a, 5b to be focused at a light sensitive medium 14 after reflection from a facet of the scanning device 12.

Medium 14 may be a photosensitive drum or belt such as used in the conventional xerographic process which rotates or moves consecutively through a charging station (not shown) where the medium is electrostatically charged by a corona discharge device, a scanning/exposure station (as shown) where the beams 5a, 5b reflected from the rotating polygon 12 traverse a scan line of width x on the drum or belt, through a developing station (not shown) using a cascade development enclosure, a transfer station (not shown) where a web of copy paper or cut paper is passed in contact with the drum or belt and receives an electrostatic charge to induce a transfer of the developed image from the drum or belt to the paper, and a fusing device (not shown) which fixes the images to the paper. Also possible are photographic paper, film, or any other light sensitive substance, material or combinations of layered materials.

Useable images are provided in that the information content of the scanning spot is represented by the modulation or variant intensity of light beams 5a and 5b respective to their position within the scan width x. As a spot traverses a charged surface, the spot dissipates the electrostatic charge in accordance with its light intensity. The electrostatic charge pattern thus produced would be developed in the developing station and then transferred to the final copy paper. The belt or drum would be cleaned by some cleaning device such as a rotating brush before being recharged by the charging device. In this manner, the information content of the scanned spot is rcorded on a permanent medium. Of course, alternative prior art techniques may be employed to cooperate with the scanning/exposure station shown in FIG. 1 in order to utilize the information conveyed thereby.

As shown in FIG. 1, the polygon 12 is continuously driven by a motor 17 and may be synchronized in rotation to a synchronization signal representative of the scan rate used to obtain the original video information signal. In the case of the utilization of a xerographic drum or belt, the rotation rate of the drum or belt determines the spacing of the scan lines.

Medium 14 may require a light exposure intensity beyond that which can be provided by the light beam emitted by one of the injection diode lasers 4a, 4b when that beam is scanned by polygon 12 at the conventional scan rate. Accordingly, the diode laser array is oriented relative to the polygon scanner reflection facets so that each of the beams 5a, 5b emitted by the array is, when imaged, caused to illuminate the same scan spots on the same scan line of the medium 14. That is, the array 2 is oriented so that the intersection of the plane of the reflection surface and the plane containing beams 5a and 5b is a line parallel to the desired scan line direction. As the polygon scanner rotates, scan spots of a scan line 100 are first illuminated by beams 5a and those same scan spots of scan line 100 are then illuminated by beam 5b. Thus, if the beam 5a is to write scan spots at location $x_1, x_2, x_3, x_4$ along scan line 100, then the beam 5b also writes a spot at locations $x_1, x_2, x_3, x_4$ of scan line 100. Accordingly, additive or increased exposure intensity is achieved at locations $x_1, x_2, x_3, x_4$. The increased exposure intensity will provide adequate exposure intensity to discharge the electrostatic charge at points $x_1, x_2, x_3, x_4$ of scan line 100. If two laser beams cannot provide the desired discharge, then a laser array with greater than two lasers would be provided, with the number of lasers corresponding to the required exposure intensity for the medium 14.

Since beam 5b is trailing beam 5a, the data stream applied to laser 4b is delayed by a time corresponding to the separation on the medium 14 between the light spots of beam 5a and the light spots of beam 5b. That is, the time delay ($t_d$) must equal the physical separation (s) of the imaged spots at medium 14 (the laser separation modified by the magnification of the optical system) divided by the speed ($V_s$) at which the spots are being scanned across the horizontal scan line 100. Accordingly, as determined by the speed and number of facets of polygon 12, the video signal applied to laser 4b is appropriately delayed, such as by insertion of a delay line 200 in the video signal input line to laser 4b. Since both s and $V_s$ change slightly with lateral position across a horizontal scan line, it may be necessary to vary $t_d$ according to scan position to obtain exact spot registration.

Figure 2:
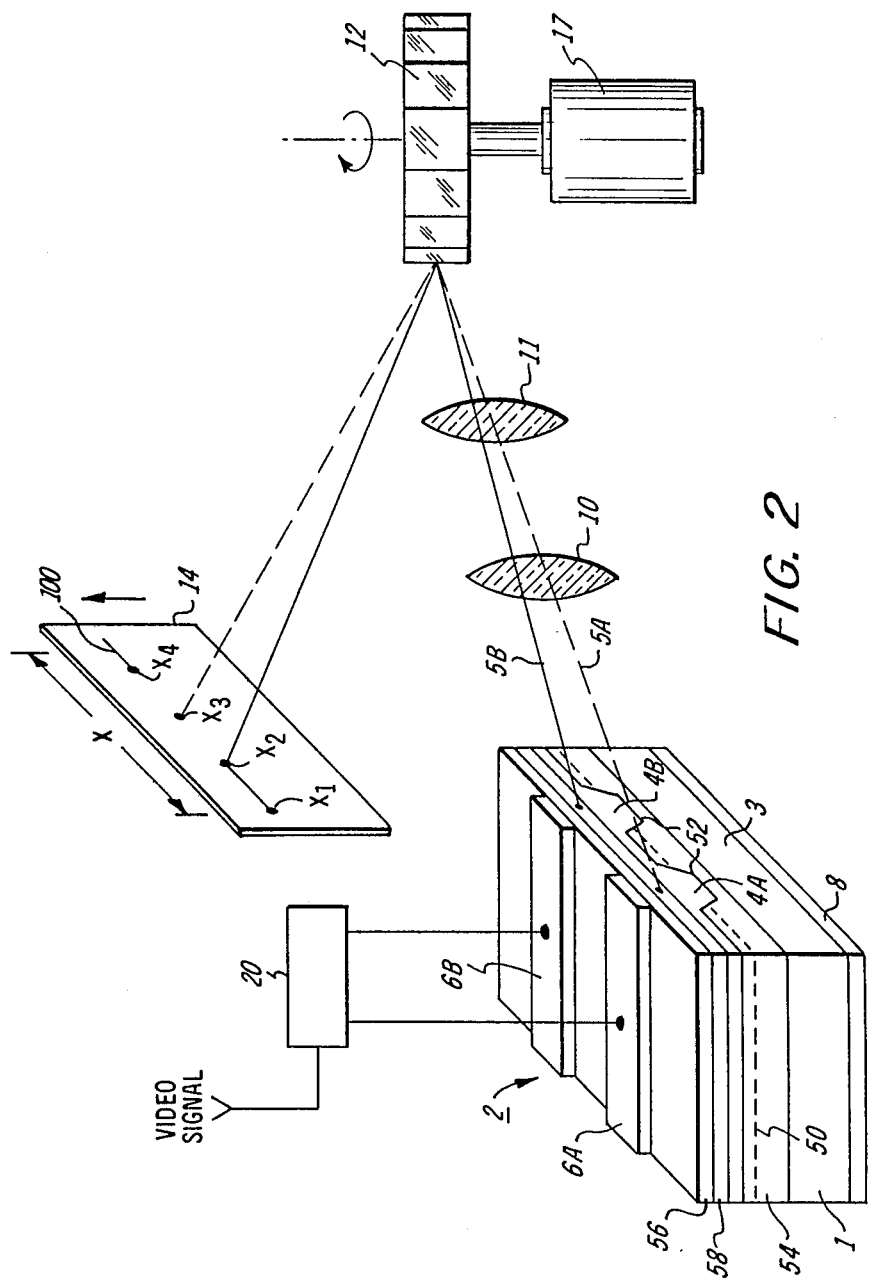

An alternative mode of operation for the system of FIG. 1 is to have each laser of an array of N lasers expose only 1/N spots across a scan line. This mode of operation would permit each laser to operate at a lower duty cycle than the operation described in relation to FIG. 1, whereby the pulse power emission from each laser can be increased to provide from one laser the required exposure intensity at the medium 14. Such a system could be used to achieve "gray scale" printing with a wider range of exposure between gray levels. Specifically, as shown in FIG. 2, laser 4a would be used to illuminate only odd numbered scan spot locations along line 100 and laser 4b would be used to illuminate only even numbered scan spot locations along line 100. Such interleaving is accomplished, for example, by supplying the video input data signal to a conventional 1 to 2 demultiplexer 20 which samples the video signal at the data clock rate and outputs every other sample to a different one of the electrodes 6a, 6b. Now, lasers 4a and 4b are alternately pulsed at only ½ the clock rate but at a higher pumping level or possibly a longer time than in the system of FIG. 1 such that each laser delivers a higher integrated output power level (greater total energy) than when pulsed in the manner of the system of FIG. 1.

Figure 3:
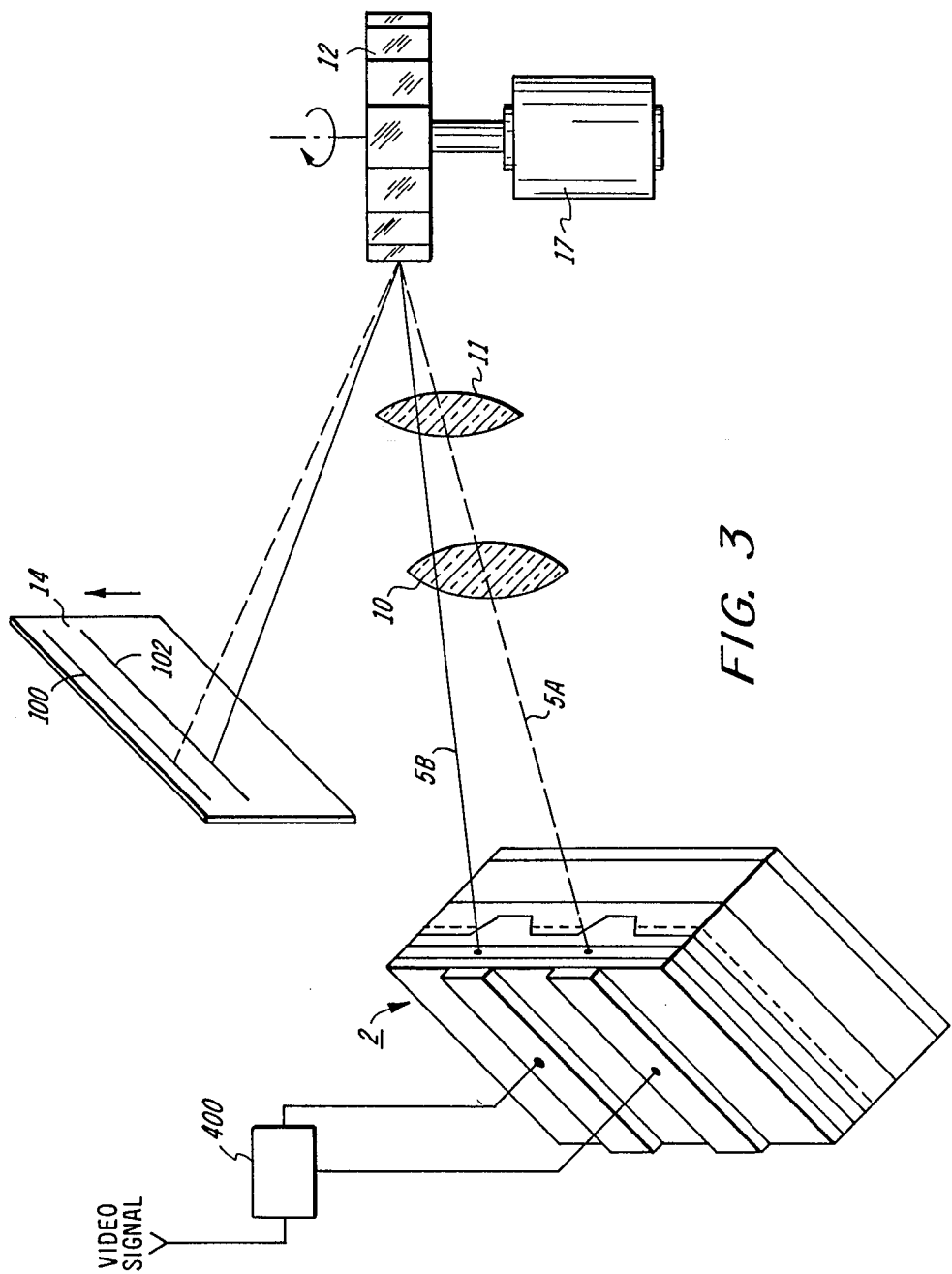
FIGS. 3 and 4 are perspective views of an optical system for simultaneously scanning different scan lines of a photosensitive surface with plural light beams.
Figure 4:
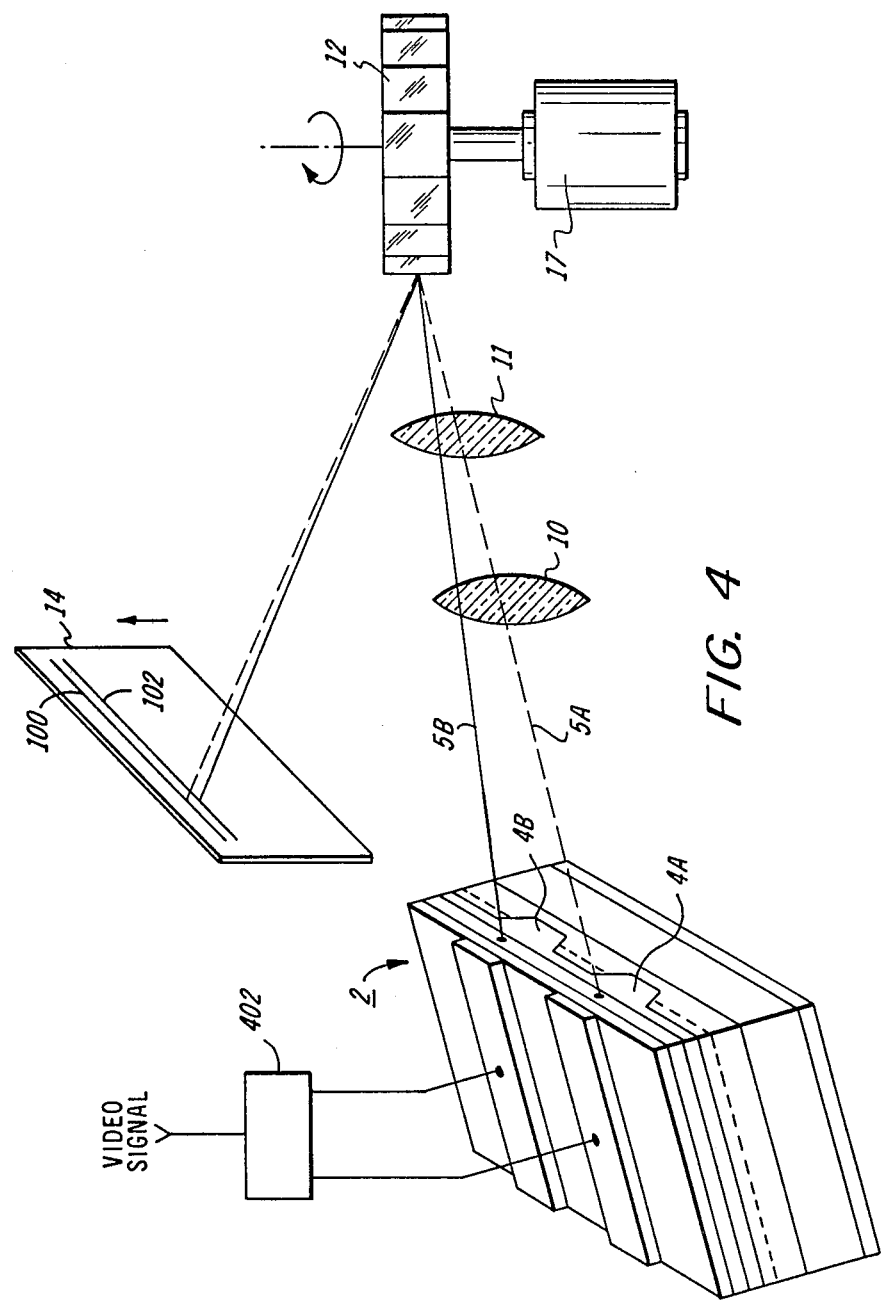

In those instances where a single injection diode laser can expose each scan spot location of a scan line of a photosensitive medium with the required exposure intensity for that medium, the emitting surface of the laser array can be oriented relative to the scanning device so that each beam emitted by an array of N lasers simultaneously illuminates a different scan line position of the medium. Referring to FIG. 3, the array 2 is oriented so that the intersection of the plane of the reflecting surface of the polygon and the plane containing beams 6a and 6b is a line which is at an angle to the scan line direction. That angle will vary from 90° in the case (FIG. 3) where it is desired to provide maximum separation between scan lines 100 and 102 that are being simultaneously scanned to a very small acute angle (FIG. 4) in the case where it is desired to simultaneously scan adjacent lines having only a small separation. In the configuration of FIG. 3, the separation between simultaneously scanned lines 100 and 102 will be equal to the separation between the lasers 4a and 4b modified by the magnification of the optical system. In the configuration of FIG. 4, the separation between simultaneously scanned lines 100 and 102 can be less than the physical separation between lasers 4a, 4b and, in fact, it is possible to simultaneously scan adjacent scan lines having a separation equal to the desired system resolution.

Referring again to FIG. 3, since the vertical separation between simultaneously scanned lines 100 and 102 is equal to the laser separation times the optical system magnification, which separation may be substantially greater than the desired system resolution, a fairly substantial data buffer 400 is needed to provide for the proper positioning of the encoded information. That is, if the simultaneously scanned lines are separated by a distance of 800 microns and each resolvable spot has a diameter of 40 microns, buffer 400 must be capable of storing 20 scan lines of information. An advantage of the system of FIG. 3 is that the printing speed can be substantially increased up to N times (for an array of N lasers) owing to the increased optical power which can be obtained from laser array 2, or the rotation speed of the polygon scanner can be decreased (or the number of facets thereof decreased) up to a factor of N or any combination thereof while maintaining the same number of resolvable scan spots per scan line inch. Thus, a high speed high resolution digital printer/copier is provided.

Referring again to FIG. 4, by choosing the proper intersection line/scan line angle, adjacent simultaneously scanned lines can be arranged so that the vertical separation between scan spots of those scan lines is equal to that of the desired system resolution. Thus, consecutive horizontal scan lines can be written by lasers which have a physical separation greater than the vertical separation between the simultaneously imaged scan lines. Since each scan spot is laterally (horizontally) displaced relative to the next, a data buffer 402 having a capacity equal to one scan line of data plus (or minus) the additional horizontal displacement due to the separation between the lasers is all the buffer capacity needed in the input line to the lasers 4a, 4b. Thus, in the embodiment of FIG. 4, the advantages of the embodiment of FIG. 3 accrue while the buffer memory requirement of the system is substantially reduced.

Figure 5:
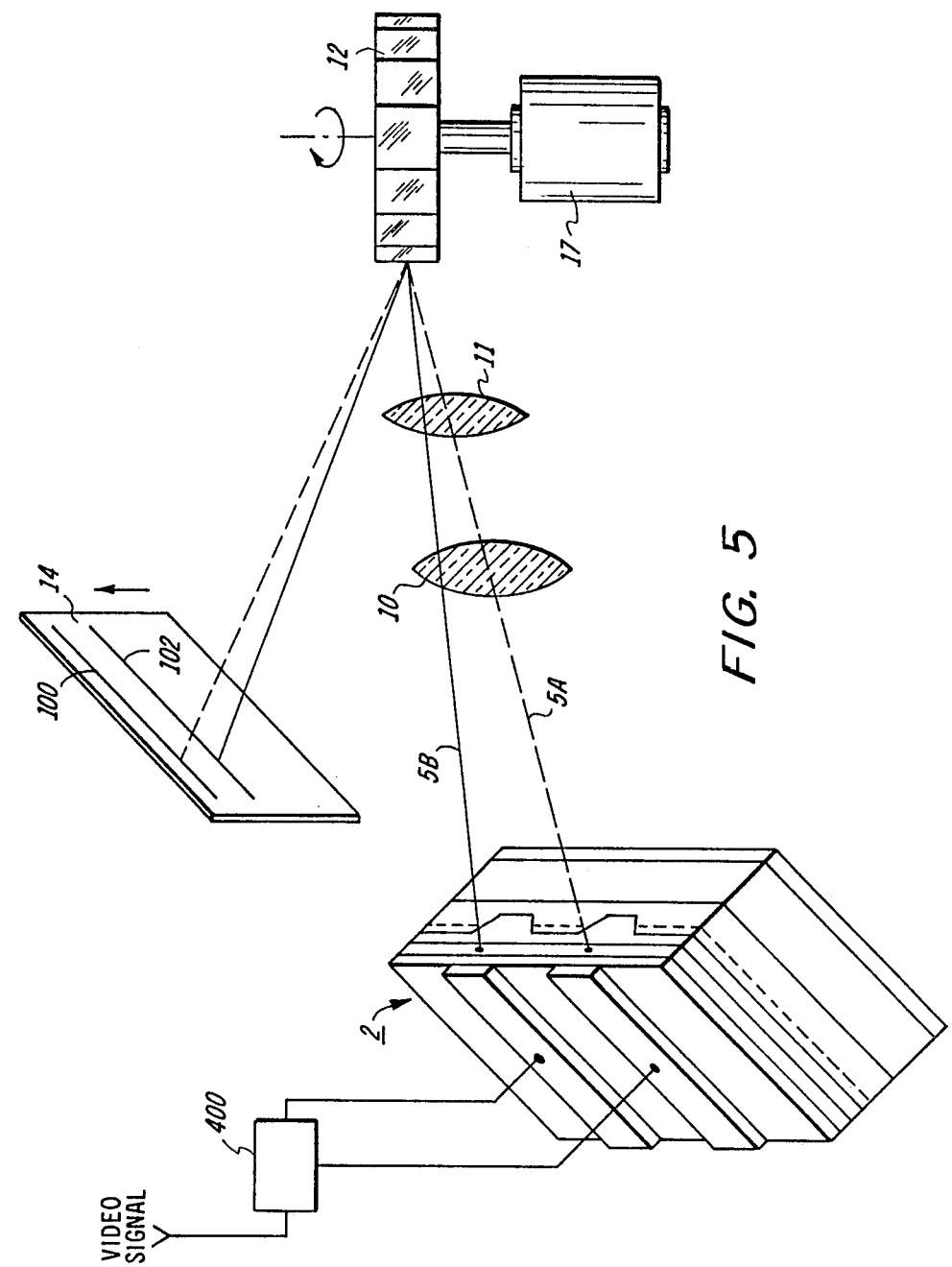
FIGS. 5, 5a and 5b are perspective views of an optical system for simultaneously scanning different scan lines of a photosensitive surface with plural light beams not focused at the plane of the photosensitive surface.
Figure 5A:
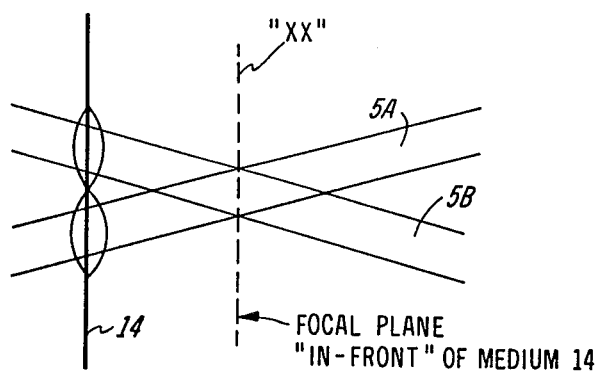
Figure 5B:
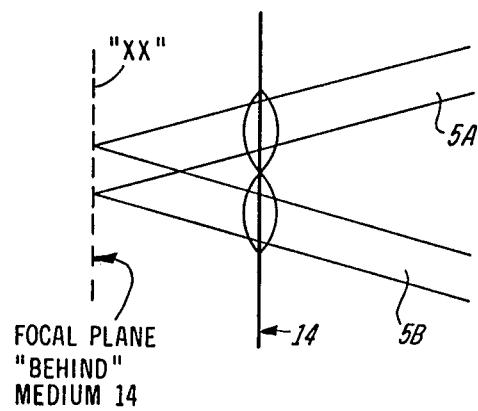

In the system of FIG. 3, the optical system images or focuses the scanning spots at the surface of medium 14. In the system of FIG. 5, the laser array is oriented as in FIG. 3, but the optical system does not focus the laser beams at the surface of medium 14 but rather the laser beams are focused at a plane xx slightly in front of (FIG. 5a) or slightly behind (FIG. 5b) the medium 14. Because the laser beams 5a and 5b diverge rapidly after leaving the laser 4a and 4b, a plane xx exists where the far field spot patterns of the laser beams overlap or nearly overlap, with those far field spots approximately the shape needed for exposing medium 14. Thus, by placing the medium 14 at the location of plane xx the far field spots illuminate the medium 14 with a high resolution, and adjacent horizontal scan lines can be written simultaneously. In this configuration, the buffer 400 need store only a single line of information for each laser in the array.

Figure 6:
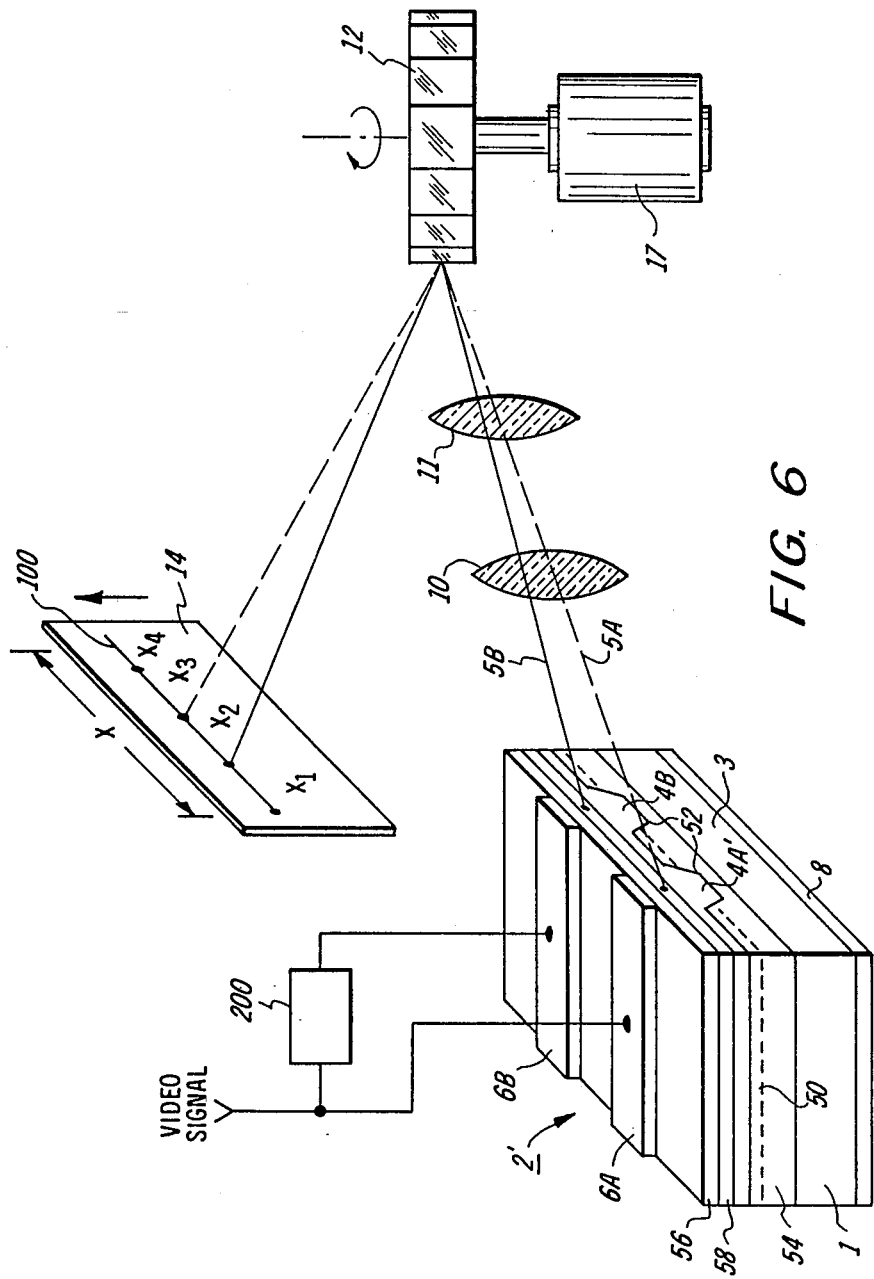
FIG. 6 is a perspective view of an optical system with backup laser capabilities.

An added advantage of utilizing a diode laser array in a digital printer/copier is increase system reliability. Although diode lasers operate for times in excess of 10,000 hours, additional reliability could be achieved by using an array of laser diodes in a scanning system. For example, as shown in FIG. 6, the laser array 2' is comprised of lasers 4a and 4a', with laser 4a normally operative. If the laser 4a should become inoperative that failure is sensed by a failure sensing mechanism (such as an optical detector) and the data stream is switched to its companion or back-up laser 4a', thereby replacing the failed light source without any physical repositioning. Instead of requiring physical repositioning, the electronic data stream to the failed laser is time delayed by a delay mechanism such as achieved by conventional integrated circuit technology and supplied to the backup laser so that it prints at exactly the same position on the medium 14 as the failed laser would have printed. Thus, system reliability is enhanced with electronic sensing and switching and no need for human intervention.

We claim:

1. A light scanning system comprising:
   a photosensitive surface;
   a semiconductor diode laser array including a plurality of linearly aligned diode lasers on a common semiconductor substrate;
   first means for supplying a video drive signal;
   second means for supplying said drive signal to at least some of said plurality of lasers of said array to provide for emission of a plurality of light beams from said array with each of said beams modulated in accordance with said drive signal information;
   optical means for focusing said plurality of light beams at said photosensitive surface; and
   scanning means for scanning said plurality of light beams across linear portions of said photosensitive surface;
   wherein said array is oriented relative to said scanning means and said photosensitive surface such that each of said plurality of light beams scans the same data spots of at least one linear portion of said photosensitive surface.

2. The system of claim 1 wherein said second means includes means for delaying the supply of said drive signal to at least one of said plurality of lasers of said array.

3. A light scanning system comprising:
   a photosensitive surface;
   a semiconductor diode laser array including a plurality of linearly aligned diode lasers on a common semiconductor substrate;
   first means for supplying a video drive signal;
   second means for supplying different portions of said drive signal to different ones of said diode lasers to provide for emission of a plurality of light beams with each of said beams modulated in accordance with a different information component of said drive signal;
   optical means for focusing said plurality of light beams at said photosensitive surface; and
   scanning means for scanning said plurality of light beams across linear portions of said photosensitive surface;
   wherein said array is oriented relative to said scanning means and said photosensitive surface such that said plurality of light beams simultaneously scan different data spots of at least one linear portion of said photosensitive surface.

4. The system of claim 3 wherein said second means includes a demultiplexer.

* * * * *